United States Patent [19]
Zavislan

[11] Patent Number: 6,134,010
[45] Date of Patent: *Oct. 17, 2000

[54] IMAGING SYSTEM USING POLARIZATION EFFECTS TO ENHANCE IMAGE QUALITY

[75] Inventor: James M. Zavislan, Pittsford, N.Y.

[73] Assignee: Lucid, Inc., Henrietta, N.Y.

[ * ] Notice: This patent is subject to a terminal disclaimer.

[21] Appl. No.: 09/235,253

[22] Filed: Jan. 22, 1999

Related U.S. Application Data

[63] Continuation-in-part of application No. 08/966,046, Nov. 7, 1997.
[60] Provisional application No. 60/072,334, Jan. 23, 1998.

[51] Int. Cl.$^7$ ..................................................... G01Y 4/00
[52] U.S. Cl. .................... 356/364; 356/369; 359/371; 600/473; 600/476; 250/201.3
[58] Field of Search .................. 356/364, 365, 356/366–369, 345, 351, 353; 250/225, 234, 235, 236, 201.3; 359/386, 370, 385, 371; 600/473, 476

[56] References Cited

U.S. PATENT DOCUMENTS

| | | | |
|---|---|---|---|
| 2,074,106 | 3/1937 | Foster ....................................... | 359/386 |
| 2,303,906 | 12/1942 | Benford et al. .......................... | 359/386 |
| 3,958,884 | 5/1976 | Smith ....................................... | 356/251 |
| 5,078,482 | 1/1992 | Feldman et al. ........................ | 359/371 |
| 5,699,160 | 12/1997 | Barenboim et al. ..................... | 356/359 |
| 5,710,631 | 1/1998 | Bou-Ghannam et al. ............... | 356/351 |
| 5,764,363 | 6/1998 | Ooki et al. ............................... | 356/364 |

FOREIGN PATENT DOCUMENTS

WO-8807695 10/1988 WIPO .................................... 359/386

OTHER PUBLICATIONS

Lessor et al., "Quantitative surface topography determination by Normarski reflection microscopy. I. Theory". J. Opt. Soc. Am., vol. 69, No. 2, Feb. 1979, pp. 357–366.
Schmitt et al., "Use of polarized light to discriminate short–path photons in a multiply scattering medium", Applied Optics, vol. 31, No. 30, Oct. 20, 1992, pp. 6535–6546.
Rajadhyak et al. "In Vivo Confocal Scanning Laser Microscopy of Human Skin: Melanin Provides Strong Contrast", The Society for Investigative Dermatology, Inc., vol. 104, No. 6, Jun. 1995, pp. 1–7.
Rajadhyak et al., "Confocal laser microscope images tissue in vivo", Laser Focus World, Feb. 1997, pp. 119–127.

*Primary Examiner*—Hoa Q. Pham
*Attorney, Agent, or Firm*—Kenneth J. Lukacher; Martin Lukacher

[57] ABSTRACT

The quality of images produced by confocal microscopy, and especially scanning laser confocal microscopy, is enhanced especially for images obtained in turbid mediums such as many biological tissue specimens, by reducing speckle from scatterers that exist outside (above and below) the section which is being imaged by utilizing sheared beams, both of which are focused to laterally or vertically offset spots and polarizing the beams to have opposite senses of circular polarization (right and left handed circular polarization). The return light from the section of certain polarization is detected after passing through the confocal aperture of the confocal microscope. Images can be formed using optical coherence detection of the return light. Light from scatterers outside the section of interest, which are illuminated by both of the sheared beams, interfere thereby reducing speckle due to such scatterers, and particularly scatters which are adjacent to the section being imaged. Sheared beams having orthogonal linear polarization, as may be obtained from a Wollaston or Nomarski prism are converted into circularly polarized beams of opposite polarization sense by a quarter wave plate and focused into laterally displaced spot. A Dyson type lens is used to obtain sheared beams which when focused form vertically displaced spots. The optical signals representing reflections from the section are derived by polarizing optics which may either be a polarizing beamsplitter in the incident beam path or a retarder and analyzer. The retarder may be selected to provide different polarization phase shifts of the return light, and with the analyzer, detects the degree of elliptical polarization representing the optical activity and circular dichroism producing the optical signal representing the image.

30 Claims, 8 Drawing Sheets

IMAGING SYSTEM USING POLARIZATION EFFECTS TO ENHANCE IMAGE QUALITY

This application claims the benefit of priority from co-pending U.S. Provisional Application Ser. No. 60/072,334, filed Jan. 23, 1998, and is a continuation-in-part of U.S. patent application Ser. No. 08/966,046, filed Nov. 7, 1997, and incorporates by reference subject matter disclosed in Applicant's U.S. patent application Ser. No. 08/966,046.

DESCRIPTION

The present invention relates to imaging systems which enhance image quality by reducing noise which reduces contrast in images especially images obtained from turbid media, such as encountered in biological specimens, and especially dermatological tissue wherein keratin is present. Media, which are turbid, may be characterized by having a high rms refractive index variation and high scattering cross sections.

The invention is especially suitable for use in confocal microscopy and especially in laser scanning confocal microscopes such as the Vivascope confocal scanning laser microscope sold by Lucid Technologies, Inc. of Henrietta, New York, U.S.A. and described in an article by M. Rajadhyaksha, et al. entitled "*In Vivo Confocal Scanning Laser Microscopy of Human Skin, Melanin Provides Strong Contrast*" that appeared in the Journal of Investigative Dermatology, Volume 104, No. 6 pg. 1 (June 1995) and also the subject matter of an article by M. Rajadhyaksha and James M. Zavislan which appeared in Laser Focus World, pg. 119 (February 1996) and in the hand held scanning laser microscope which is the subject matter of U.S. patent application Ser. No. 08/650,684 filed May 20, 1996 in the name of James M. Zavislan et al. The invention is also useful in optical coherence tomography or interference microscopy.

It has been discovered in accordance with the invention, that by illuminating a medium by beams having generally circular polarization in opposite senses (left and right handed circular polarization) images obtained from return light from an image plane or section within a specimen, by responding to circular dichroism and retardation, of the return light (circular dichroism and retardation is intended to include degrees of elliptical polarization), that image distortion, such a produced by scattering sites adjacent to the image plane or section, tends to be minimized or at least reduced to a constant value, while optical signals due to index variations and other optical activity within the image plane or section (region of interest) are actually detected. Thus correlated noise from scatterers, which produces optical distortion and especially speckle effects in the image, are reduced thereby enhancing the quality of the image. The focal region (image plane or section) may be at the surface of the specimen or embedded in the specimen. Noise due to scattering sites away from the focal region may occur, whether the region is at the surface or embedded in the specimen. The section being imaged, especially in imaging of biological tissue, is of the thickness of a cell, for example about five microns.

Regions adjacent to the section of interest may have an abundance of scatterers both behind and ahead of the section in the direction of propagation of the illuminating beam which is incident on the section. These potential scattering sources are illuminated by the same optical field that illuminate the region of interest. There is a finite probability that return light from these scatterers will pass through a confocal aperture and reach the detector as optical signals from which the image of the section of interest is constructed. The spurious return light may manifest itself as speckle in the image. The use of sheared circularly polarized beams, in accordance with the invention, has been found to reduce such distortion, and especially speckle distortion, thereby providing additional contrast and enhancing the image quality.

Laser scanning confocal microscopy provides image enhancement in that laser light beams are used, especially beams of a wavelength, such as in the infra-red range, which are maximally transmitted. The confocal aperture restricts the section which is imaged to the focal region. The probability, nevertheless exists that scattered light from regions away from the focal region will pass through the confocal aperture and produce noise, especially speckle, which distort and reduce contrast in the image which is detected. It has been proposed to use light restricted to one polarization state, but only for surface reflection reduction by eliminating the other polarization state. It has also been proposed to use sheared beams and differential interference contrast to enhance microscope images. Such beams have been obtained using Nomarski or Wollaston prisms and the technique of using such sheared beams has been referred to as Nomarski microscopy. See D. L. Lessor et al. "*Quantitative Surface Topography Determination by Nomarski Reflection Microscopy*", Journal of the Optical Society of America, Volume 69 No. 2, pg. 357 (February 1979). Nomarski microscopy techniques have also been proposed for use in confocal microscopy. See C. J. Cogswell, "*Confocal Differential Interference Contrast (DIC) Microscopy*", Journal of Microcopy, Vol. 165, Part I, pp. 81–101 (January 1992). Even with Nomarski techniques applied to confocal microscopy, noise distortion, which appears to emanate from scattering sites adjacent to the focal plane or image plane of interest, has not been minimized.

It is a feature of the present invention to further enhance image quality in imaging systems by utilizing circularly polarized beams focused on the image plane thereby obtaining noise reduction in the image, especially speckle noise which may be attributable to scatterers adjacent to the image plane. The spots may be laterally offset or vertically offset and provide different modalities for imaging whereby different images are formed which can be combined, additively or subtractively or by otherwise relating corresponding pixels (multiplicatively or divisibly). Thereby optically simulating the effects of stains and dyes on tissue or providing assays of molecular species, e.g., sugars or proteins.

The noise reduction system described herein has application to optical coherence imaging often referred to as optical coherence-domain reflectivity, optical coherence tomography or optical coherence microscopy. (See Schmitt et al, *Optical characterization of dense tissues using low-coherence interferometry*, SPIE, Vol. 1889, pps 197–211, July 1993.) In this imaging modality, a low-coherence source is used to illuminate a interferometer with a phase-modulated reference arm and a sample arm. In the sample arm a focusing objective directs light into a sample, often a turbid biological specimen. Only light which is scattered from a depth in the tissue that has equal optical path as the optical path of the reference arm constructively interferes at the detector to provide an electronic signal that represents the optical signal from the sample. This coherence requirement eliminates the need for a confocal pinhole to select the image plane inside the tissue. Optical coherence imaging however, suffers from the same deleterious effect of adjacent scatters as does confocal imaging. This effect is reduced, however, by the same polarization illumination and detection system previously described.

Accordingly, it is the principal object of the present invention to provide improved imaging systems, and especially imaging systems using confocal microscopy, and more especially laser scanning confocal microscopy.

It is a further object of the present invention to provide improved confocal microscopes and especially improved laser scanning confocal microscopes.

It is still further object of the invention to provide improved confocal laser scanning microscopes which provide images of biological tissue, and especially dermatological tissue.

It is a still further object of the inventor to provide improved instruments using optical coherence interferometry.

Briefly described, a system embodying the invention enables viewing of section of a medium. Light is received by and returned from the section and from sites adjacent to the section. The system utilizes a polarization separator, such as a Nomarski or Wollaston prism, or a Dyson type lens, and a polarization retarder, such as a quarter wavelength plate, both operative on laser light which is incident on the medium and which are disposed successively in the direction of the incident light. The separator and retarder process the incident light into light which is polarized generally circularly and in opposite senses. This oppositely handed polarized light is incident on the medium in the section being imaged at spots which are spaced laterally or vertically, respectively, depending upon whether the prism or the lens polarization separator is used, and nominally in the plane of the section of interest providing interference of light returned from the sites (scatterers) adjacent to the section being imaged. The image may be constructed in response to a polarization parameter, for example the degree of circular dichroism, of the return light.

The foregoing and other objects, features and advantages of the invention, as well as presently preferred embodiments thereof, will become more apparent from reading of the following discussion in connection with the accompanying drawings in which.

Figure 1:
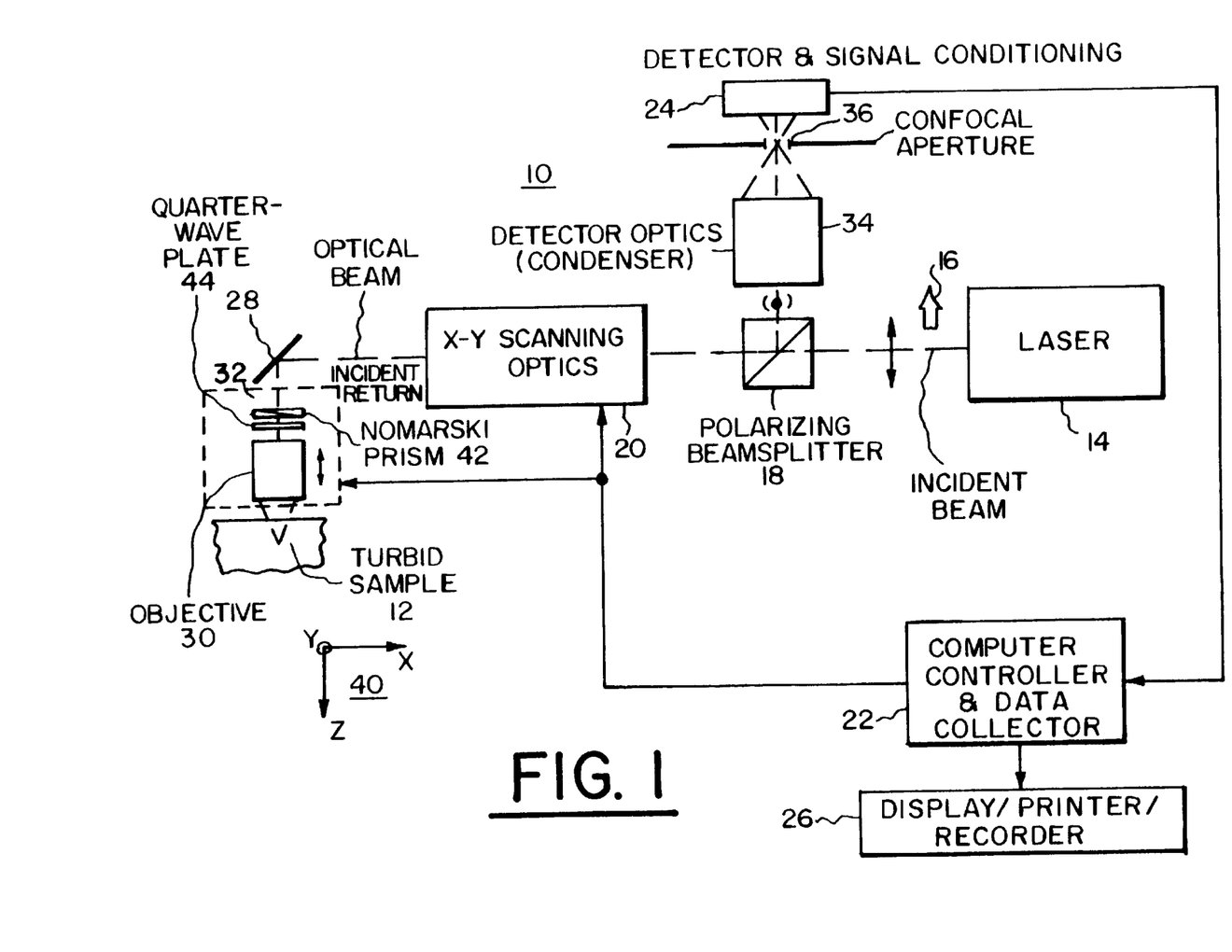
FIG. 1 is a schematic diagram of a laser scanning confocal microscope which embodies the invention.

Referring to FIG. 1, there is shown a confocal laser scanning microscope wherein the beam, which is made incident on and illuminates a turbid sample 12, is obtained from a single mode laser 14, which in the case where the microscope is used to image a section of dermatological tissue (forming the turbid sample 12), is preferably in the infra-red range. The incident beam from the laser is linearly polarized as indicated by the arrow 16. A polarizing beam spitter 18 passes the incident beam to scanning optics 20.

These scanning optics provide scanning in an X, Y direction, where X and Y are coordinates orthogonal to each other in the image plane. The scanning optics may be an undulating or pivoting mirror and a rotating polygon mirror as in the Vivascope laser scanning confocal microscope referenced above. Orthogonal mirrors may provide the scanning optics, as in the confocal scanning microscope described in the above-referenced publications. The scanning optics is controlled by a computer controller 22 which also collects image data from a photo detector 24 and constructs the image either on a display, printer or a recorder 26.

The incident and return beams are deflected by a mirror 28 toward the sample 12 and pass through an objective lens system 30 to the focal or image plane in the specimen.

Optical polarization processing elements 32 are disposed in the beam path ahead of the objective 30. The return light from the image plane is again deflected by the scanning optics 20 and deflected by the beamsplitter 18 through detector optics (a condenser lens system) 34 to the detector. The detector optics focuses the light at the center of a confocal aperture 36. In order to select the image plane, the objective 30 together with the polarization processing optics 32 (which may be an assembly) is movable under control of the computer controller 22 in the Z direction which is a direction perpendicular to the X and Y direction as shown at 40. So far described, except for the processing elements, the confocal laser scanning microscope 10 is similar to that described in the referenced article and patent application.

Figure 2:
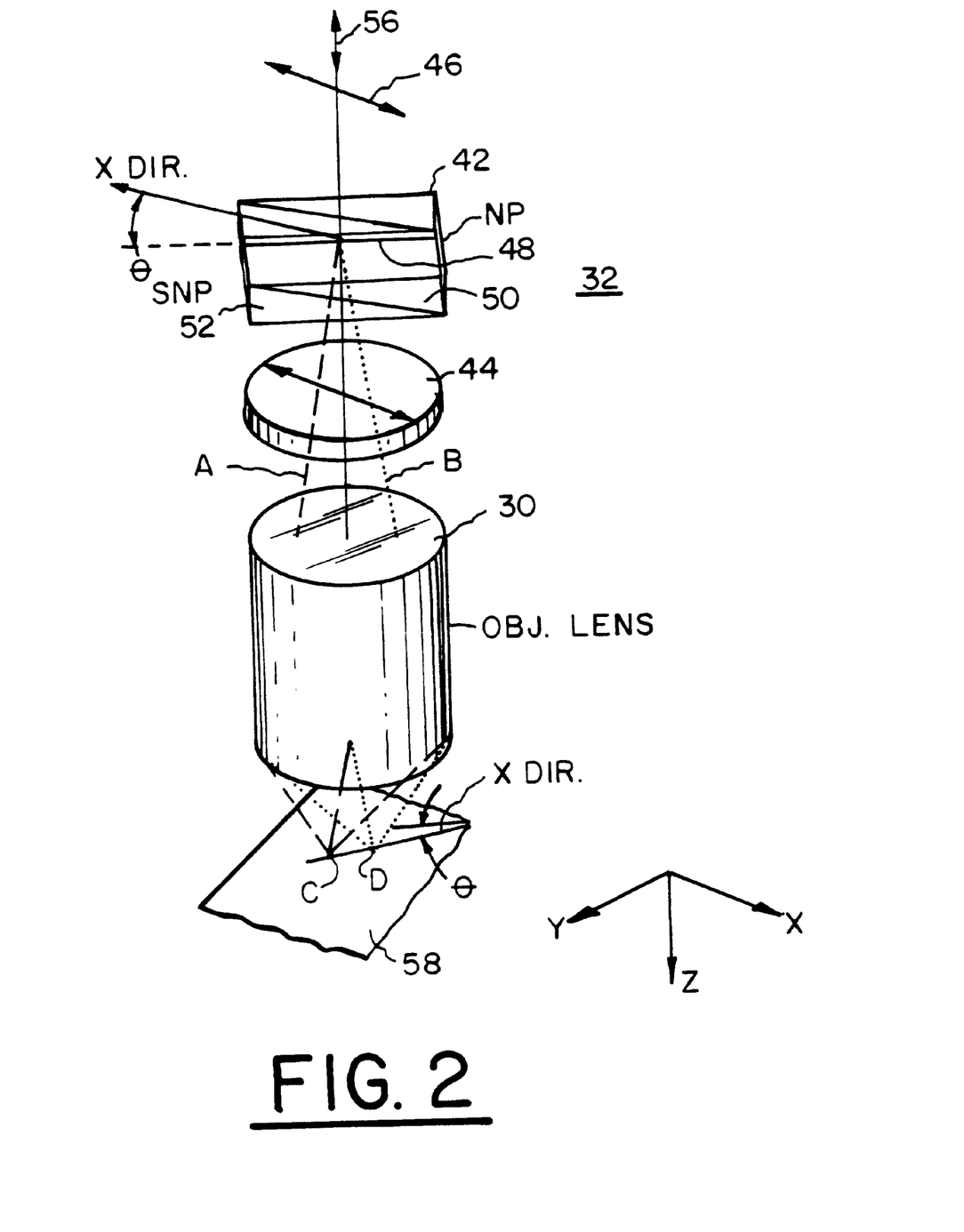
FIG. 2 is a schematic diagram illustrating the polarization processing, in the microscope of FIG. 1, of the incident light and the collection of the return light from an image section which is shown as a focal plane.

In the embodiment of FIGS. 1–4, the polarization processing optics 32 is provided by a Wollaston, but preferably a Nomarski, prism 42 and a quarter wave phase retarder or plate 44 which interposes a quarter wave or 90 degrees phase delay at the laser wavelength. This retarder 44 may be a plate of transparent, bi-refringent material such a quartz, calcite, etc. The state of polarization of the incident beam contains polarization components parallel and perpendicular to the optical axis 48 of the upper section 50 of prism 42. For example, linear polarization at 45° as shown in FIG. 2. The optical axis of the lower section 52 of the prism is orthogonal to the optical axis 48 of the upper section 50. The optical axes are determined by the crystal structure of the prism structure. Light polarized perpendicular to the optical axis is passed through the prism section without extraordinary refraction. For further and more detailed definition of the optical axis of crystals, see Yariv et al., "*Optical Waves in Crystals*", published by John Wiley and Sons (1984), especially section 4.2.

Because the incident polarization 46 contains components of polarization parallel to both optical axes of the prism sections, the prism 42 splits or shears the incident beam 56 into two linearly polarized beams, A and B. The axes of polarization for the two beams are parallel to each of the optical axes of the two prisms in the Nomarski's prism. The shear is in a direction transverse to the direction of propagation of the incident bean 56. Both beams pass through a 90° phase retarder 44 with its fast axis 45° to each polarization axis of beams A and B. The beams A and B are focused at spots C and D, respectively in the focal or image plane 58. It will be appreciated that these spots are scanned in X, Y, and Z over the image plane in order to provide optical signals from which the image can be constructed, after detection by the detector 24, in the computer 22. Preferably the spots substantially overlap. They are suitable separated by a distance, D/4, where D is the Airy diameter of focal spots formed by the objective 30.

The light is returned and collected by the objective 30 and combined inside of the prism 42, and returned as general elliptically polarized beam. The polarization state of the light returned from the spots C and D depends upon the optical activity and optical retardance, particularly the difference in the average refractive index across the spots C and D. Accordingly, the amount of light from the image plane, which is focused by the condenser 34 and passes through the confocal aperture as the optical signal which is detected by the detector, 24 depends upon the amount of polarization rotation, or the differential interference which produces a phase rotation of the polarization vector. Since the polarizing beamsplitter is set to reflect the polarization orthogonal to the incident polarization 16, towards the detector with greatest efficiency, the intensity of illumination at the detector depends upon the rotation and polarization (in effect the degree of elliptical polarization) which is produced by the material in the sample in the image plane.

Because of the quarter wave plate 44, the incident beams A and B are orthogonally polarized (preferably circularly polarized) in opposite senses. Therefore, they have a 180° phase difference between them. Both beams illuminate the noise producing scatterers outside (above and below) the focal plane, because of the nearly complete overlap of the two beams outside the focal region. The beams are spaced from each other in the focal plane (in the image section of interest). It is believed that destructive interference of the light returned from the scattering sites outside of the image section of interest reduces distortion, particularly speckle distortion, of the image. However, circular dichroism, optical retardance and other optical activity exists between the light returned from the spots C and D. The optical image forming signal from the focal plane may be diminished due to interference effects, but at a much lower rate than the illumination due to the scatterers away from the focal plane. Accordingly, the optical image signal in the return light, is effectively enhanced, while the noise signal is reduced, thereby reducing the noise and increasing the quality and contrast enhancement in the image from the image plane.

Figure 3:
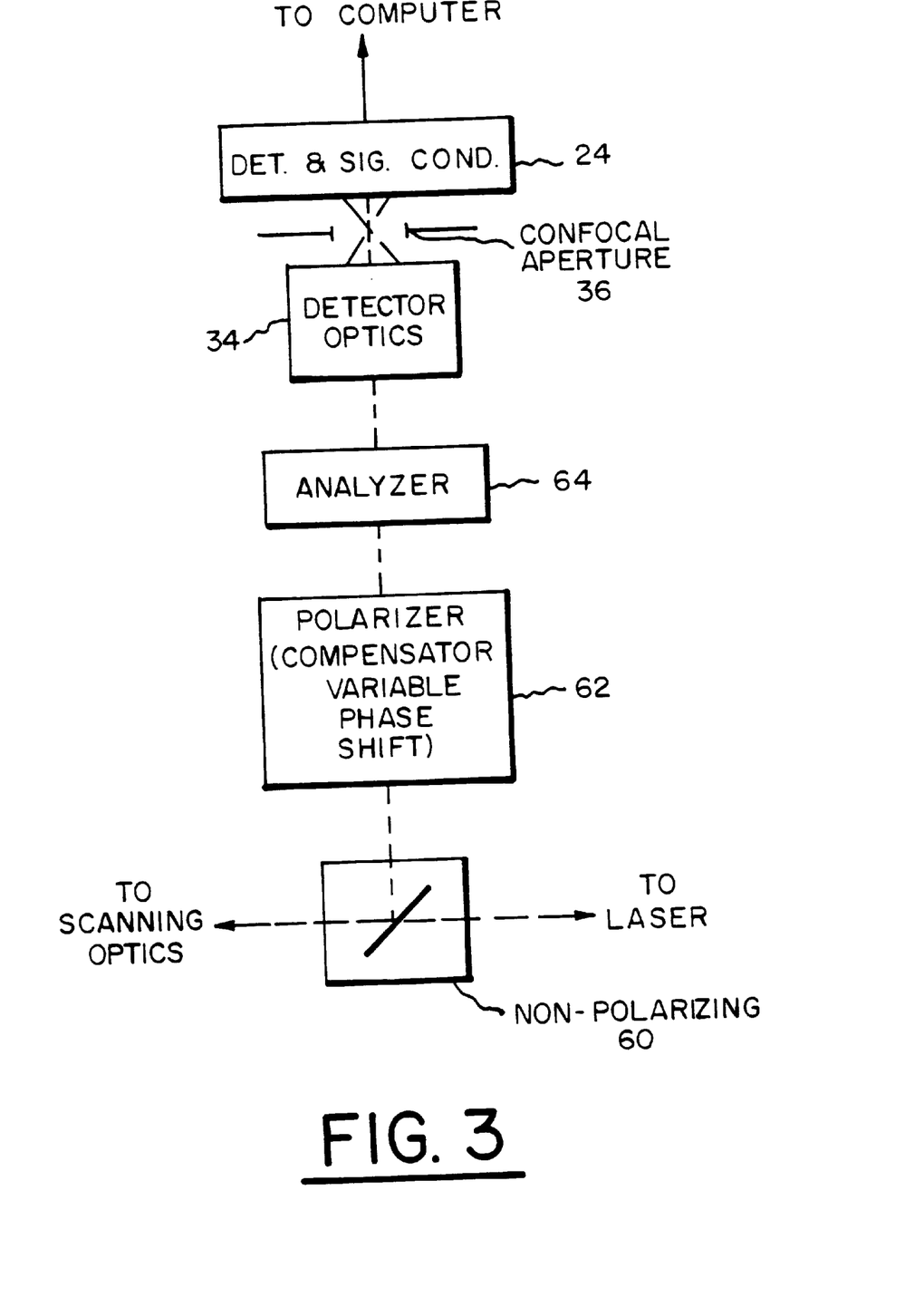
FIG. 3 is a schematic diagram showing the collection optics in the return arm of a confocal microscope system of the type illustrated in FIG. 1 which detects the ellipticity of polarization (providing an ellipsometer) and enables the construction of the image in response thereto.

Referring to FIG. 3, collection optics in accordance with another embodiment of the invention is illustrated. There, a non-polarizing or leaky beamsplitter 60 passes the laser light beam to the scanning optics and deflects the return beam without completely selecting a component of polarization state orthogonal to the incident polarization, as was the case with the polarizing beamsplitter 18. A retarder 62, which may introduce a variable phase shift, effects the polarization of the return beam. This retarder may be similar to a Babinet-Soliel compensator. This retarder can add a phase shift along any axis to convert the return light to a certain polarization state. The amount of polarization shift depends upon the ellipticity of the polarization of the return beam. A analyzer 64 passes the beam from the retarder 62 to the extent that the polarization state of the polarizer is congruent with the polarization of the analyzer. Accordingly, the light or optical signal passed by the analyzer is a function of the ellipticity of the return beam. The return beam is them focused by detector optics 34 at the confocal aperture 36 and then detected by the photo detector 24.

The analyzer and polarizer constitute an ellipsometer. Certain types of optical activity and retardation effectively elliptically polarize the return beam. This is especially the case in biological tissues where the molecular bonds have spiral structure characterizing certain proteins and sugars, which constitute the cells of these tissues. Accordingly the processing of the return light and the detection of the degree of elliptical polarization and ellipse orientation may provide images representing characteristics of biological tissue which are of interest.

Desirably, the photo detector 24 includes amplification and signal conditioning circuits so as to process the electrical signal corresponding to the optical signal for reliable digitization in the computer 22.

Figure 4:
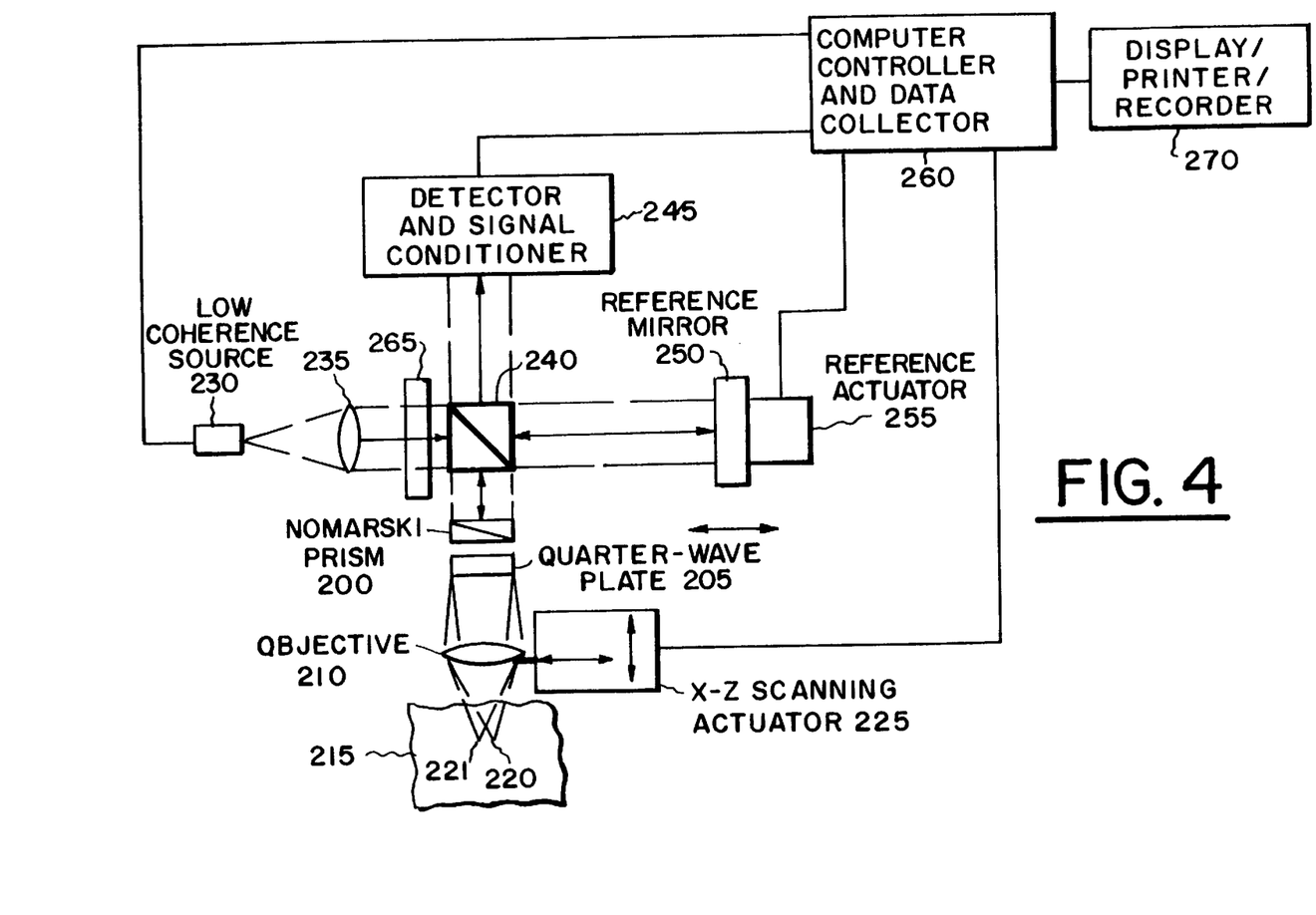
FIG. 4 is a schematic diagram of an optical coherence imaging system embodying the invention.

FIG. 4 shows an optical coherence imaging system with improved imaging. A low coherence optical source 230 such as super luminescent diode or femtosecond laser is collimated by lens 235. A linear polarizer 265 polarizes the incident light. The polarization state is oriented to be in the plane of FIG. 4. The light then passes into beamsplitter 240 which is nominally 50%—50% non-polarizing beamsplitter. A portion of the light is directed to a reference mirror 250. Reference mirror 250 is actuated by transducer 255, which may be a piezo-electric actuator. This actuation modulates the phase of the reference arm light.

A portion of the light is reflected toward the sample, first through the polarization separator 200, which is either a Wollaston or Nomarski prism, and next through a polarization retarder 205, such as a quarter-wave plate. The Nomarski prism is oriented such that the incident polarization is at 45° to the optical axes of the birefringent material which make up the Nomarski prism. The fast axis of the quarter-wave place is oriented at 45° to the linear polarizations emitted from the Nomarski prism. The quarter-wave plate converts the two orthogonally polarized linear polarizations to orthogonally polarized circular polarizations. The angularly sheared, circularly polarized beams are focused to two spots 220 and 221 by lens 210.

Light scattered from the two spots inside or on the object is collected by lens 210 and angularly combined by the polarization separator 200 and directed towards the beamsplitter 240. A portion of the reference and sample light is directed to a photodetector and signal conditioning circuit 245 which may be a silicon photodiode and amplifier. The portion of the light from both arms incident on the detector that is both parallel and coherent will interfere in a detection arm terminated at the detector 245 and produce a phase modulated electric signal which varies synchronously with the reference mirror position. The amplitude of the modulated signal is proportional to the reflectance of the subject at the point inside the object that has equal optical path as the reference arm to within the coherence length of the source.

As with the confocal system described previously, there are signal contributions from scatterers above and below the surface which equal path as the reference arm. These scatters will produce speckle noise that interferes with the fidelity of the signal. The polarization separator 200 and polarization retarder 205 operate in optical coherence imaging systems in an analogous manner as in the confocal case. The scatters which are outside the surface of equal optical path will be illuminated by the orthogonally polarized spots 220 and 221. The light from these scatterers will be substantially destructively interfere at the detector because the two polarizations have 180° phase difference and illuminate each of the scatters similarly.

Controller 260 controls the scan position of the objective lens 210 through actuator 225. Controller 260 also controls the position of actuator 255 which controls the position of reference mirror 250. The Controller collects the signal and decodes it with the position information of the actuators and drives a display or recorder 270.

Figure 5:
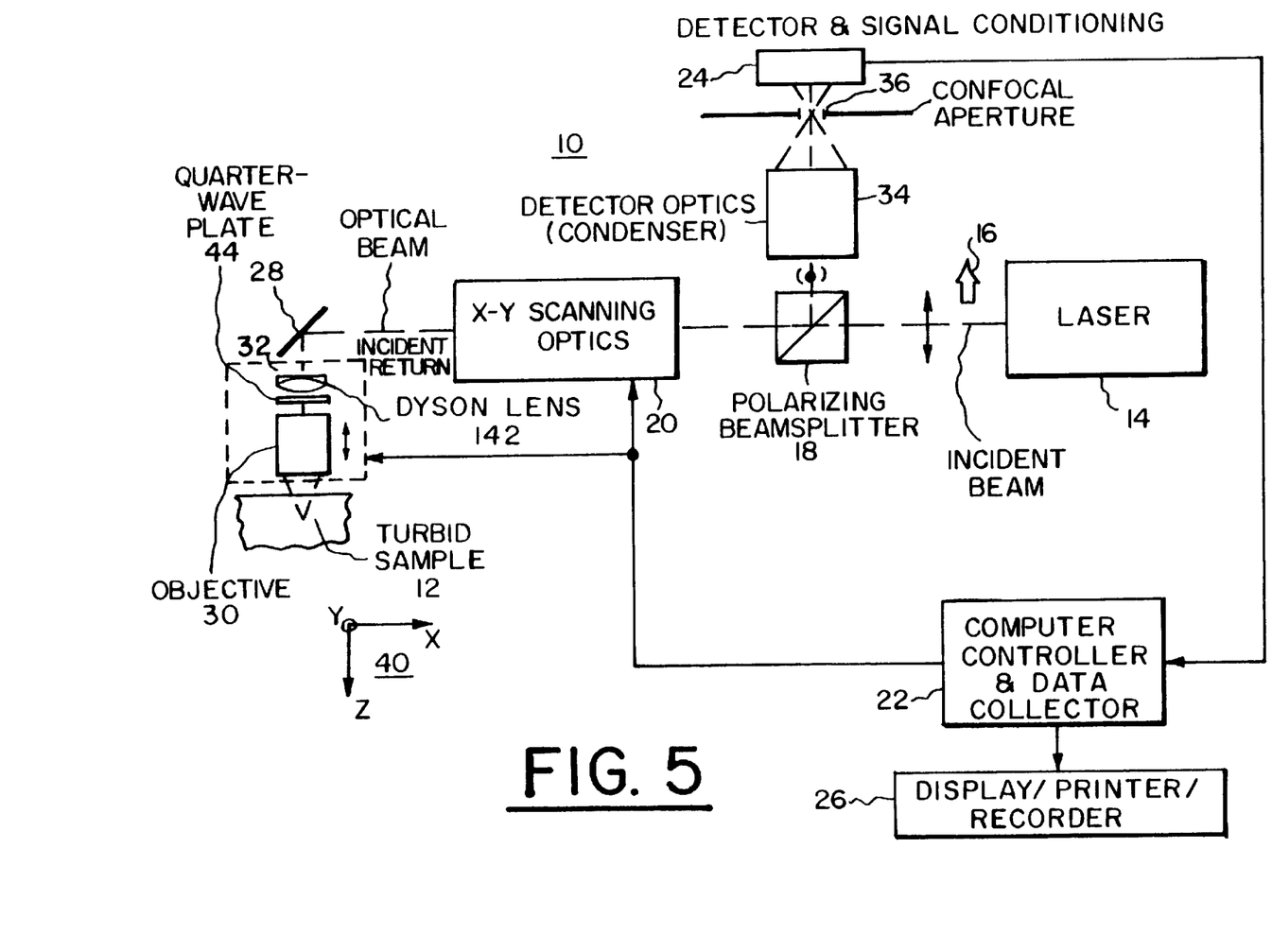
FIGS. 5, 6, 7 and 8 are diagrams similar to FIGS. 1, 2, 3 and 4 respectively, but where a Dyson type lens is used as the polarization separator.
Figure 6:
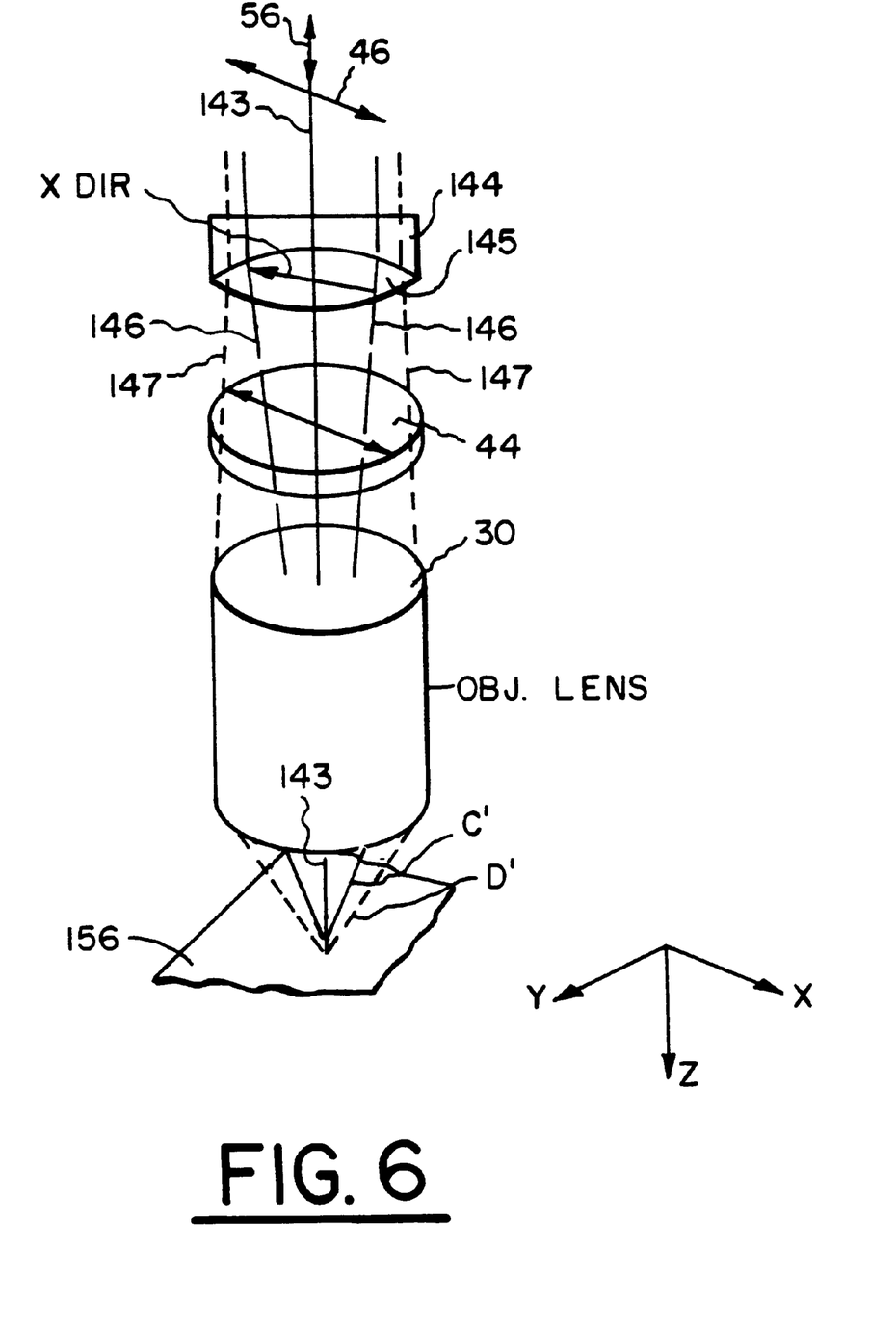
Figure 7:
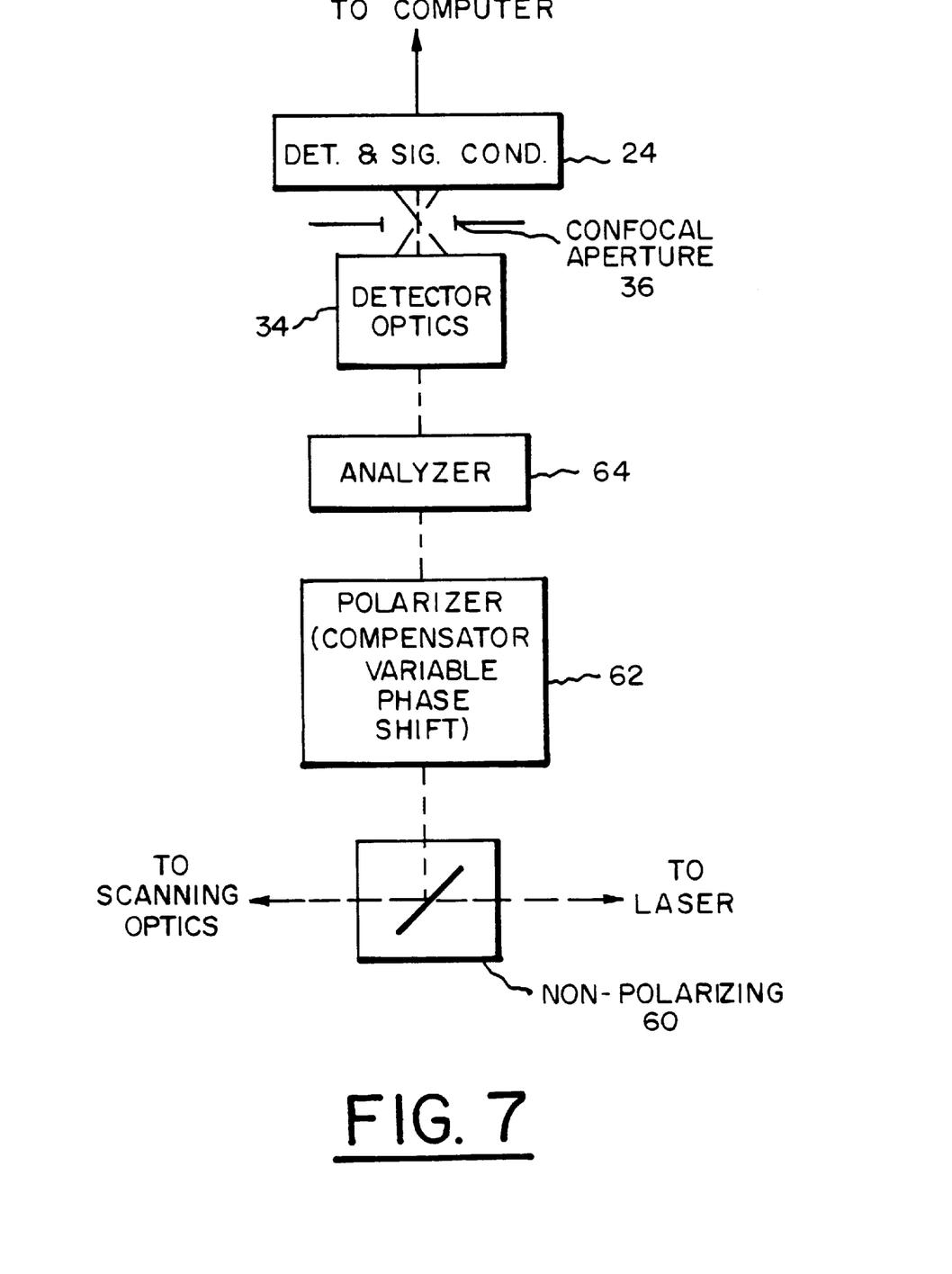

Referring to FIGS. 5, 6 and 7 there is shown a confocal microscope system where the polarization separator is a Dyson lens 142. Dyson lens are described in the text, Optical Interferometry by M. Fracon, Academic Press, New York (1966) at pages 158–160 in this text. The Dyson lens shown in the text is a triplet. Preferably the Dyson lens 142 is a doublet having sections spaced along the optical axis 143. The upper section 144 is a plano concave lens having negative power while the lower section 145 is a biconvex lens having positive power. The lower section may be calcite or magnesium fluoride while the upper section 144 may be glass. The crystal axis of the upper and lower section may be oriented in the same direction as the optical axis of the upper and lower sections 50 and 52 of the prism 42 described above in connection with FIG. 2. Then both polarizations see the same negative power of the upper section 144. The polarization state parallel to birefringent optical axis of lens section 145 sees the extraordinary retractive index. The polarization state perpendicular to the birefringent optical axis of lens section 145 sees the ordinary refractive index. Thus, two polarization states see two different refractive indices and are focused with different refractive power. In both cases the powers of the sections of the Dyson type lens are desirably weak to give a different focal power of approximately ⅕ diopter. One polarization will be sheared into a converging beam as shown by the solid lines 146 and into a diverging beam, which may be as shown by the dashed lines 147.

After going through the objective 30, the focus will be at two spots or points C' and D', which are vertically offset or spaced from each other along the optical axis 143. The vertical offset may be approximately one-quarter of the axial resolution of the objective. An objective 30 of thirty times magnification is believed suitable for obtaining the requisite spot separation. The vertically offset dots are in the image section 150 which is being imaged as the spots are scanned by the XY scanning optics 20. Since the contrast is a function of the difference in optical properties over the offset distance, the image represents the derivative in the intensity of the light reflected from the spots which is returned through the objective lens and recombined in the Dyson type lens 142.

The quarter wave retarder 44 provides orthogonally circular polarized light which enables interference of light from scatterers outside of the section of interest where the image is formed as explained in connection with the embodiment of FIGS. 1–3.

The laterally offset spots produce an image related to the derivative of refractive index in the X-Y plane. The vertically offset spots produce an image related to the derivative along the Z axis. Since cellular structure is conformed to the tissue surface which is often planar, the images from the laterally offset and vertically offset imaging modalities will be sensitive to different cellular morphology. Because the differences in image appearance is attributable to cellular morphology, the image modalities assume a similar image enhancement role as the stains and dyes used in traditional pathologic tissue preparation.

These images may be combined additively, subtractively, multiplicatively or divisibly so as to enable a pathologist viewing the image to label different tissue types based upon the differences in the images which he observes. The combination of multiple imaging techniques enable the assay of the content of different molecules in tissue; for example, sugar content based upon differential images, since sugar is optically active.

Except as discussed above the confocal microscope system shown in FIGS. 5, 6 and 7 operates as discussed in connection with FIGS. 1, 2 and 3.

Figure 8:
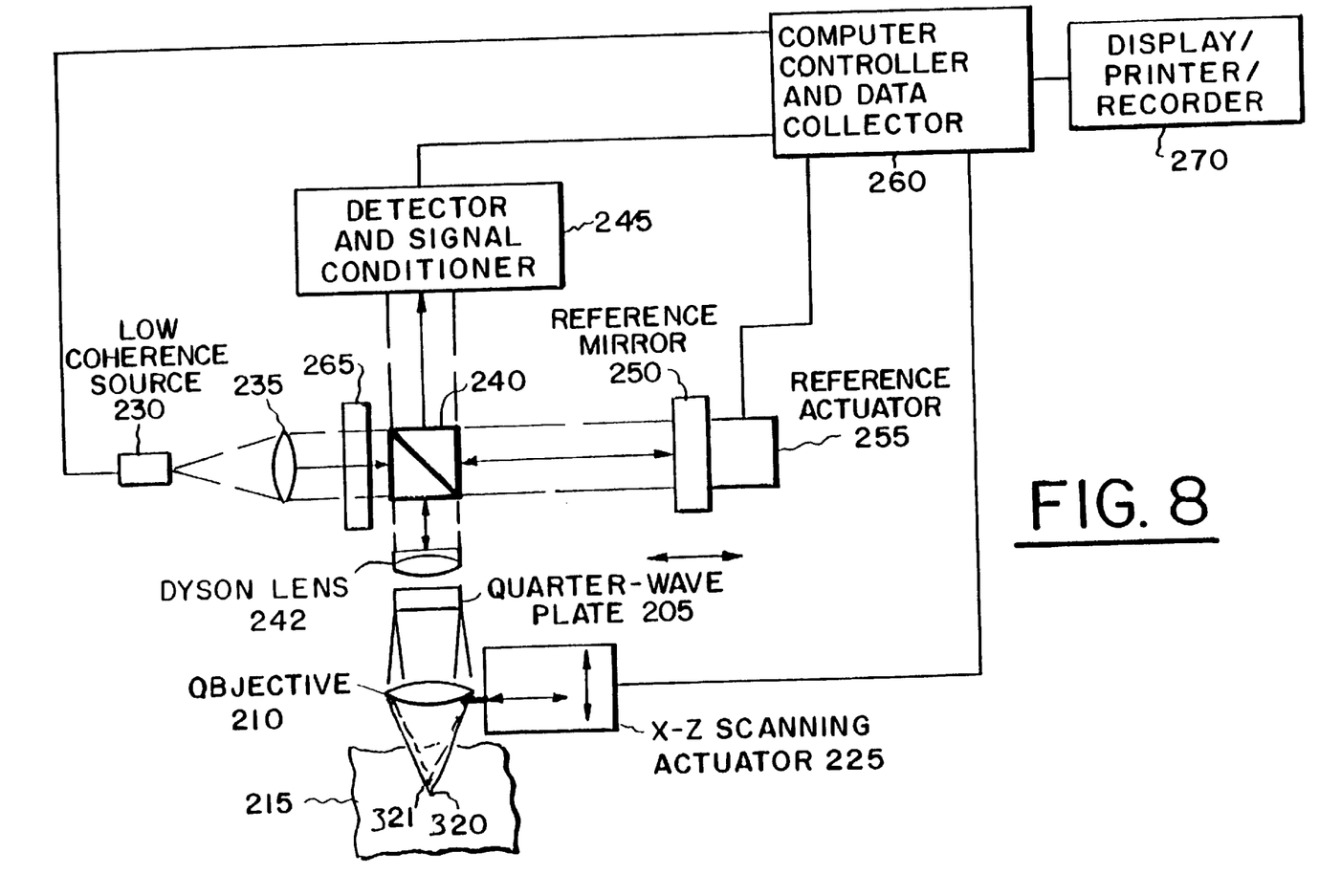

Similarly in the coherence interferometry imaging system shown in FIG. 8, the only difference is the substitution of a Dyson type lens 242 for the Nomarski prism 200. The orthogonally polarized spots 321 and 320 are vertically rather than laterally displaced. Reference may therefore be had to the foregoing description for information as to the construction and operation of the coherence imaging system shown in FIG. 8.

Furthermore, while imaging in X-Y plane is the preferred embodiment, images can be generated by scanning the objective lens to create X-Z or Y-Z images.

From the foregoing description, it should be apparent that there has been provided an improved imaging system, and especially an imaging system which is especially adapted for providing improved confocal microscopes and especially laser scanning confocal microscopes and which is also applicable for optical coherence tomography or microscopy. Variations and modifications in the herein described system, within the scope of the invention, will undoubtedly suggest themselves to those skilled in the art. Accordingly the foregoing description should be taken as illustrated and not in a limiting sense.

What is claimed is:

1. A system for viewing of a section of a medium which receives and returns light both from the section and from sites adjacent to the section that reduces the quality of an image formed from said return light from said section, said system comprising a polarization separator and the polarization retarder, which are disposed successively in the path of the light received by the medium for processing the light said medium receives into light which is polarized generally orthogonally and is incident on said medium at spots spaced from each other, thereby providing interference of light returned from said sites and enabling construction of said image in response to a polarization parameter of said return light.

2. The system of claim 1 wherein means are provided for focusing said light processed by said polarization separator and said retarder into foci at said spots.

3. The system of claim 2 wherein said spots are partially overlapping.

4. The system of claim 3 wherein said focusing means providing said spots is an objective optic and said separation of said foci is about one-quarter (¼) of the axial resolution of said objective optic.

5. The system of claim 1 wherein said polarization parameter is the degree of rotation of the polarization of said return light from said spots.

6. The system of claim 1 wherein said polarization parameter is a function of the optical activity of the light returned from said spots.

7. The system of claim 6 wherein said optical activity is differential circular dichroism.

8. The system according to claim 1 further comprising a condenser for providing said return light and an objective for focusing said spots, thereby providing a microscope for viewing or construction of an image of said section.

9. The system according to claim 8 wherein said microscope is a confocal microscope having a splitter passing light received by said medium and deflecting said return light to said condenser, a confocal aperture said condenser focusing said return light at said confocal aperture.

10. The system according to claim 1 further comprising a scanner in the path of said light for said spots with respect to said section.

11. The system according to claim 10 wherein said scanner is an X-Y scanner, where X and Y are orthogonal directions along said section, an objective focussing said light at said spots, and said polarization separator, polarization retarder and objective being movable in a Z direction orthogonal to said X and Y directions.

12. The system according to claim 10 wherein said scanner is in the path of said incident and return light.

13. The system according to claim 1 further comprising a laser providing a beam of said light which is incident on said medium with polarization such that said beam is sheared in the same direction as said beam and said spots are spaced in the same direction as said beam.

14. The system according to claim 1 wherein said polarization separator is Dyson type lens having refracting portions which have optical axes oriented in directions transverse to each other.

15. The system according to claim 14 wherein said light received by said medium is provided as polarized light substantially linearly polarized along one of said optical axis.

16. The system according to claim 15 wherein said polarization retarder is an optic providing a phase shift of substantially 90°.

17. The system of claim 1 further comprising polarization responsive optics in the path of said return light for passing, for construction of said image, light having predetermined polarization.

18. The system of claim 17 wherein said polarization responsive optics comprises a polarization beam splitter which transmits said light received by said medium and deflects said return light, which respectively have generally orthogonal polarizations.

19. The system of claim 17 wherein said polarization responsive optics comprises a polarizer and analyzer for passing light with selectable elliptical polarization as the polarization parameter for construction of said image represented by selected optical activity.

20. The system of claim 19 wherein said polarizer is a variable optical phase shifter such that said polarizer and analyzer provide an ellipsometer.

21. The system of claim 1 wherein said polarization is circular polarization in opposite senses.

22. Scanning confocal microscope which comprises a laser providing an incident beam, a beam splitter, a scanner for scanning an image plane in a specimen section and generally orthogonal X-Y direction in said plane, a polarization separator which shears said beam into two beams along a direction along said incident beam, a polarization retarder providing said shear beams of generally orthogonal polarizations, and an objective for focusing said sheared beams at spots spaced in said direction in the vicinity of said image plane and which beams overlap outside the vicinity of said image plane and which beams overlap outside the vicinity of said image plane, a confocal aperture, a photo detector behind said aperture, and optics for focusing return light deflected by said beam splitter at said aperture.

23. The microscope according to claim 22 wherein said separator, retarder, and objective are movable together to in a Z direction, generally orthogonal to said X-Y directions thereby selecting different image planes of said specimen.

24. The microscope of claim 23 wherein said separator is a Dyson type lens.

25. The microscope of claim 23 wherein said beam splitter is a polarizing beam splitter.

26. The microscope of claim 23 wherein said beam splitter is a non-polarizing beam splitter and further comprising ellipsometer optics between said beam splitter and said return light focusing optics.

27. An optical coherence imaging system which comprises a source providing light which is of low coherence, a beam splitter which deflects the light from said source into a reference arm and a sample arm to an image plane in a specimen section, a scanner in said sample arm for scanning said specimen in a generally orthogonal X-Y directions in said plane,, a polarization separator which shears said light into two beams, a polarization retarder providing said sheared beams each with an optical sense of generally orthogonal polarization, an objective having an optical axis for focusing said two beams at spots offset from each other in a direction generally along said axis which beams overlap outside the vicinity of said image plane, a detection arm into which light is directed by said beam splitter from said reference and sample arms, and means for providing images in response to interference of light in said detection arm.

28. The system according to claim 27 wherein said separator, rotator and objective are movable together to in a Z direction, generally orthogonal to said X-Y directions thereby selecting different image planes of said specimen.

29. The system of claim 27 wherein said separator is a Dyson type lens to obtain said spots offset in said direction along said axis.

30. The system of claim 27 wherein said beam splitter is a non-polarizing beam splitter.

* * * * *